(12) United States Patent
Maruoka

(10) Patent No.: US 7,604,032 B2
(45) Date of Patent: *Oct. 20, 2009

(54) PNEUMATIC TIRE WITH SPECIFIED BEAD CORE COVERING RUBBER

(75) Inventor: Kiyohito Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 240 days.

This patent is subject to a terminal disclaimer.

(21) Appl. No.: 11/446,108

(22) Filed: Jun. 5, 2006

(65) Prior Publication Data

US 2007/0056673 A1  Mar. 15, 2007

(30) Foreign Application Priority Data

Sep. 15, 2005 (JP) .............................. 2005-268737

(51) Int. Cl.
  B60C 15/00 (2006.01)
  B60C 15/04 (2006.01)
  B60C 15/06 (2006.01)

(52) U.S. Cl. ................. 152/540; 152/543; 152/547; 152/552

(58) Field of Classification Search ................. 152/540, 152/543, 547, 552
See application file for complete search history.

(56) References Cited

U.S. PATENT DOCUMENTS

| 7,152,647 | B2 * | 12/2006 | Maruoka et al. ............ 152/552 |
| 2005/0006018 | A1 * | 1/2005 | Maruoka et al. ........ 152/552 X |
| 2005/0045260 | A1 * | 3/2005 | Maruoka et al. ........ 152/547 X |
| 2005/0081976 | A1 | 4/2005 | Maruoka et al. |

FOREIGN PATENT DOCUMENTS

| JP | 61285104 A | * | 12/1986 |
| JP | 07156617 A | * | 6/1995 |
| JP | 08040026 A | * | 2/1996 |
| JP | 2001010312 A | * | 1/2001 |
| JP | 2003104016 A | * | 4/2003 |

* cited by examiner

*Primary Examiner*—Adrienne C Johnstone
(74) *Attorney, Agent, or Firm*—Birch, Stewart, Kolasch & Birch, LLP

(57) ABSTRACT

A pneumatic tire comprises a tread portion, a pair of sidewall portions, a pair of bead portions with a bead core therein, and a carcass ply extending between the bead portions through the tread portion and sidewall portions and wound around the bead core in each of the bead portions from the axially inside to the axially outside of the tire so as to form a pair of wound portions and a main portion therebetween. The bead core has a cross sectional shape elongated in a direction substantially parallel to the bottom of the bead portion so that the width thereof measured in this direction is in a range of from 1.5-2.5 times the height thereof measured perpendicularly thereto. The bead core is covered with a high modulus rubber layer having a complex elastic modulus $E^*1$ of from 20-100 Mpa and a thickness of t1 of from 0.5-3.0 mm.

5 Claims, 5 Drawing Sheets

PNEUMATIC TIRE WITH SPECIFIED BEAD CORE COVERING RUBBER

BACKGROUND OF THE INVENTION

The present invention relates to a pneumatic tire, more particularly to a bead structure suitable for heavy duty tires such as truck/bus tires which is capable of improving the bead durability.

In recent years, as a carcass securing structure suitable for heavy duty tires, a carcass ply (a1) of which edge portions (a2) are wound almost once around the bead cores (b) as shown in FIG. 5 has been proposed as disclosed in Japanese patent application publication No. JP-A-2005-162057 (also disclosed in family members US2005/0081976A1 and CN1605481A).

This structure contributes to a remarkable tire weight reduction and also has advantages that bead failures such as cord loosening and ply separation which are liable to occur starting from the terminal end of the carcass ply can be prevented because the terminal end (a2e) of the wound portion (a2) is positioned in a relatively stable region near the bead core (b).

On the other hand, as the carcass ply is wound from the axially inside to the outside of the tire, on the axially inside of the bead core (b), the carcass ply (a1) is pulled radially outwards as the tire is inflated. In the case of heavy duty tires, such tire inflation pressure is very high-usually 600 to 800 kPa—in comparison with passenger car tires, and the radially outward tension (F) tends to rotate the bead core (b) as indicated in FIG. 5 by an arrow M. Therefore, if the bead core (b) is rotated, the bead toe (ct) is lifted from the bead seat (d) of the wheel rim, accompanying the radially outward movement of the carcass ply. Similarly, if the arrangement of bead wires constituting the bead core (b) gets out of order in its axially inside portion, the bead toe (ct) is lifted. Thus, the bead durability is further deteriorated.

If this state, namely the bead toe (ct) is lifted, continues for a long time, the bead toe (ct) is very liable to be deformed permanently. Therefore, if the tire is once removed from the rim, it is difficult to remount the tire because a high percentage of the air injected into the tire to inflate the tire and to place the bead portions in place leaks through between the bead bottom and bead seat. Even if well remounted, there is a possibility of bead unseating under very severe service conditions and of deterioration of durability.

SUMMARY OF THE INVENTION

It is therefore, an object of the present invention to provide a pneumatic tire, in which the remountability to a rim and the bead durability can be improved by using a bead core which is hard to rotate and hard to deform against the radially outward tension of the carcass ply.

According to the present invention, a pneumatic tire comprises: a tread portion; a pair of sidewall portions; a pair of bead portions with a bead core therein; and a carcass ply, the carcass ply extending between the bead portions through the tread portion and sidewall portions and wound around the bead core in each of the bead portions from the axially inside to the axially outside of the tire so as to form a pair of wound portions and a main portion therebetween, wherein the bead core has a cross sectional shape elongated in a direction substantially parallel to the bottom of the bead portion so that the width (wc) thereof measured in this direction is in a range of from 1.5 to 2.5 times the height (HC) thereof measured perpendicularly thereto, and the bead core is covered with a high modulus rubber layer having a complex elastic modulus E*1 of from 20 to 100 Mpa and a thickness t1 of from 0.5 to 3.0 mm.

In this specification, unless otherwise noted, the "complex elastic modulus" means a value measured with a viscoelasticity spectrometer under the following conditions: temperature 70 deg.C, frequency 10 Hz, initial strain 10% and dynamic strain +/−1%.

DESCRIPTION OF THE PREFERRED EMBODIMENT

Figure 1:
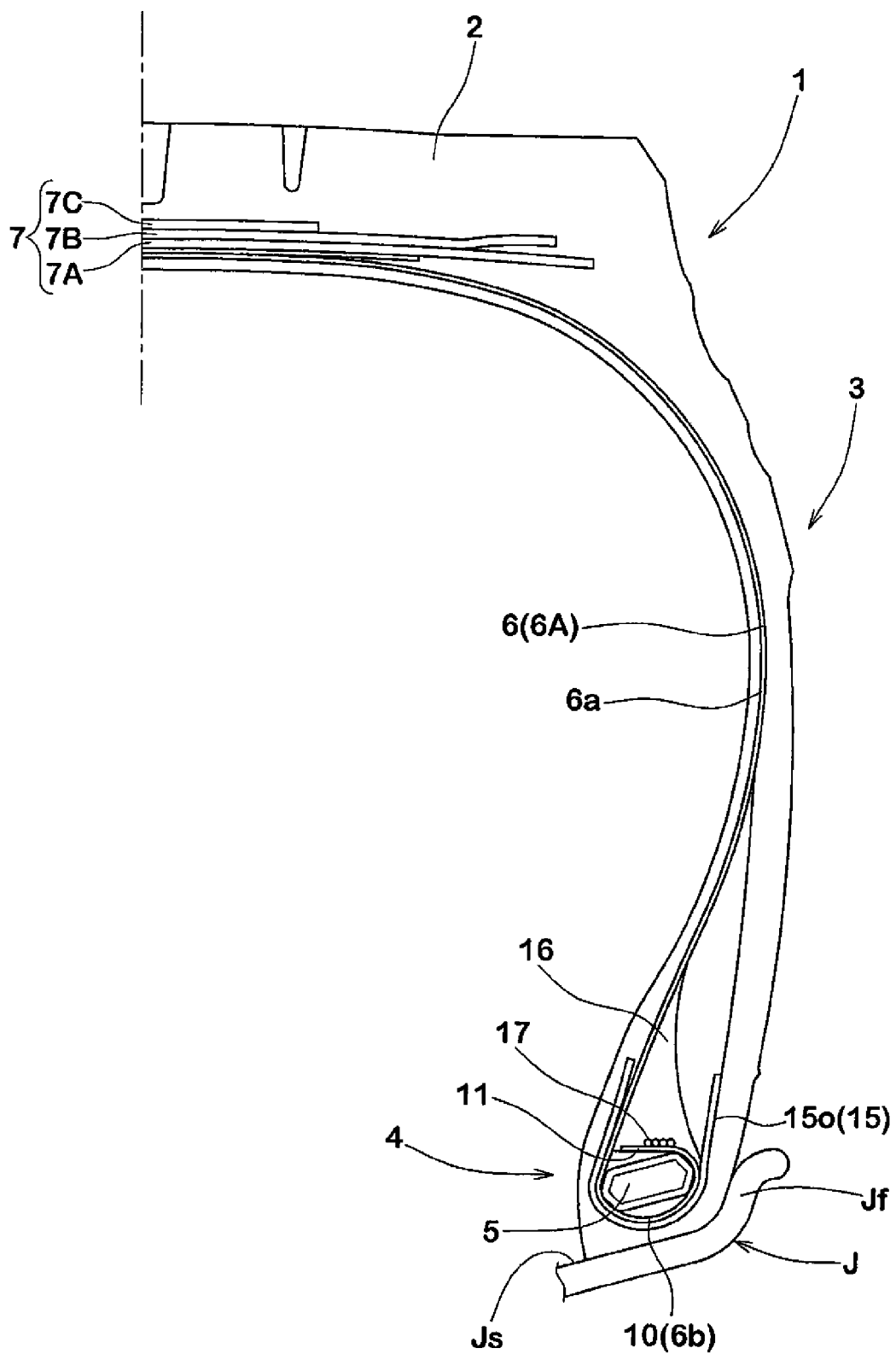
FIG. 1 is a cross sectional view of a heavy duty tire according to the present invention.

An embodiments of the present invention will now be described in conjunction with the accompanying drawings.

In the drawings, pneumatic tire 1 according to the present invention comprises: a tread portion 2; a pair of axially spaced bead portions 4 each with a bead core 5 therein; a pair of sidewall portions 3 extending between the tread edges and the bead portions; a carcass 6 extending between the bead portions 4; and a belt 7 disposed radially outside the carcass 6 in the tread portion.

In this embodiment, the tire 1 is a truck/bus radial tire to be mounted on a 15-degree taper center-drop rim which is the standard rim therefor. As well known in the tire art, a wheel rim (J) comprises: a pair of bead seats (Js) for the bead portions 4; a rim well (not shown) between the bead seats (Js) for mounting operation; and a rim flange (Jf) extending radially outwardly from the axially outer end of each bead seat (Js).

Therefore, in this embodiment, the bead seats (Js) are each tapered axially inwards at 15 degrees. As to the bead portion 4 of the tire 1, on the other hand, the bead bottom is tapered at an angle same as or slightly (at most two or three degrees) larger than that of the bead seat (Js) in order to adapt to the bead seat.

In FIG. 1, a measuring state of the tire 1 is shown. The measuring state is that a tire is mounted on a standard rim (J) and inflated to 50 kPa, but loaded with no tire load. The standard wheel rim is a wheel rim officially approved for the tire by standard organization, i.e. JATMA (Japan and Asia), T&RA (North America), ETRTO (Europe), STRO (Scandinavia) and the like. Thus, the standard wheel rim is the "standard rim" specified in JATMA, the "Measuring Rim" in ETRTO, the "Design Rim" in TRA or the like.

In this specification, the "dimensions" of respective parts or portions of the tire are measured in this measuring state unless otherwise noted.

The above-mentioned belt 7 comprises two cross breaker plies 7A and 7B of high-modulus high-strength cords, e.g. steel cords, high modulus organic fiber cords and the like. In the case of heavy duty tires, the belt 7 is usually composed of three or four plies of steel cords. Thus, the belt 7 in this example is composed of a widest radially innermost ply 7A, a second widest middle ply 7B and a narrowest radially outermost ply 7C, wherein the radially innermost ply 7A is made of parallel cords laid at an angle of from 45 to 75 degrees with respect to the tire equator C, and the middle ply 7B and radially outermost ply 7C are each made of parallel cords laid at a relatively small angle of from 10 to 35 degrees with respect to the tire equator C.

The carcass 6 comprises at least one ply 6A of steel cords rubberized with a topping rubber 6G and arranged radially at an angle of from 80 to 90 degrees with respect to the tire equator C. Preferably, the topping rubber 6G has a complex elastic modulus E*3 of from 4 to 20 MPa.

The carcass ply 6A extends between the bead portions 4 through the tread portion 2 and sidewall portions 3, and both edge portions thereof are wound almost once around the bead cores 5 in the bead portions 4, respectively, from the axially inside to the axially outside of the tire, whereby the carcass ply 6A is provided with a pair of wound portions 6b and a main portion 6a therebetween. In this embodiment, the carcass 6 is made up of the single ply 6A of which steel cords are arranged at 90 degrees.

The bead core 5 is formed by orderly winding at least one bead wire 5w into a predetermined cross sectional shape. Thus, the bead core is composed of windings of at least one bead wire 5w. In this example, the bead wire 5w is a steel monofilament.

In the present invention, in order to prevent the bead core rotation and the bead toe lifting, the cross sectional shape of the bead core 5 is elongated axially inwards so as to approach the bead toe 4t. More specifically, the cross sectional shape of the bead core 5 in this embodiment is elongated in a direction (De) parallel to the bead bottom which is tapered at substantially 15 degrees as explained above. The width WC of the bead core 5 measured in this elongated direction (De) is set in a range of at least 1.5 times, but at most 2.5 times the height HC of the bead core 5 measured perpendicularly to the elongated direction (De). In other words, the inversed aspect ratio WC/HC of the cross sectional shape is set in a range of from 1.5 to 2.5.

AS to the cross sectional shape, various shapes, e.g. oval and polygons such as tetragon, pentagon and hexagon can be used. But, in this embodiment, a hexagonal cross sectional shape is employed. This hexagonal shape has: a radially inner long side which defines a radially inner face SL of the bead core 5; a radially outer long side which defines a radially outer face SU; two axially inner sides in a v formation which define an axially inner face Si; and two axially outer sides in a V formation which define an axially outer face So.

The radially inner face SL and also outer face Su are inclined substantially parallel to the bead bottom so as to become substantially parallel to the bead seat J1 when the tire is mounted on the rim J. Thus, in the case of the bead core alone, the above-mentioned width WC and height HC can be found as measurements in the direction parallel to the radially outer face su and the direction perpendicular thereto, respectively. The expression "substantially parallel" means that the incli-nation angle may include a variation within +/−2 degrees and also a small difference which may be provided between the taper angle of the bead seat and that of the bead bottom as explained above.

The effect to prevent the above-mentioned phenomena can be enhanced by increasing the amount of elongation, but the stability of the cross sectional shape is liable to become lowered. Therefore, in order to improve the stability of such elongated flat shape, the bead core 5 is covered with a reinforcing rubber layer 13 made of a high modulus rubber having a complex elastic modulus E*1 of at least 20 MPa, preferably more than 30 MPa, more preferably more than 40 MPa, but at most 100 MPa, preferably less than 80 MPa, more preferably less than 60 MPa. The minimum covering thickness t1 thereof has to be at least 0.5 mm. Preferably the thickness t1 is at least 0.8 mm, but at most 3.0 mm, more preferably at most 2.5 mm. Therefore, the windings of the bead wire 5w are solidified by the high modulus rubber which is penetrated into the windings and are packed in the covering surface layer 13. As a result, the deformation of the bead core 5 can be fully controlled. Further, the rubber layer 13 functions as a buffer between the steel bead wire 5w and steel carcass cords, therefore, cord damages such as fretting wear due to direct contact therebetween liable to occur under very severe service conditions can be effectively prevented.

If the complex elastic modulus E*1 is less than 20 MPa, the effect of reinforcing the bead core 5 and also the buffer function become insufficient. If however, the complex elastic modulus E*1 is more than 100 MPa, the difference in rigidity from the carcass cord topping rubber 6G becomes too large, and separation from the carcass ply becomes liable to occur. Thus, the complex elastic modulus E*1 should not be increased over such limitation. Under such conditions, if the WC/HC ratio of the bead core 5 is increased over 2.5, it becomes difficult for the rubber layer 13 to provide a necessary shape stability to prevent the core deformation or disarrangement of bead wires. Thus the WC/HC ratio is limited to 2.5 or less. If the WC/HC ratio is less than 1.5, the bead core rotation and the bead toe lifting can not be sufficiently suppressed. If the minimum thickness t1 is less than 0.5 mm, the reinforcing effect becomes insufficient. If the thickness t1 is more than 3.0 mm, the volume of the bead portion 4 becomes too large, so the weight reduction is impaired.

As a means for raising the complex elastic modulus E*1, a thermosetting resin added to a rubber composition can be suitably employed although it should not be limited to this means. For instance, the reinforcing rubber layer 13 can be prepared by adding a thermosetting resin (e.g., a phenol resin) to a rubber composition comprising a diene rubber, a vulcanizing agent such as sulfur, a vulcanizing accelerator, and other usual additives. The complex elastic modulus E*1 of the rubber can be adjusted by changing the amount and/or kind of the added thermosetting resin.

The following Table 1 shows an example of the modulus variation depending on the amount of phenol resin.

TABLE 1

| Rubber compositions | A | B | C | D | E | F | G | H |
|---|---|---|---|---|---|---|---|---|
| Ingredients (parts by weight) | | | | | | | | |
| Natural rubber (NR) | 100 | 100 | 100 | 100 | 100 | 100 | 100 | 100 |
| Carbon black (N220) | 70 | 70 | 70 | 70 | 70 | 70 | 70 | 70 |
| Sulfur | 2.0 | 2.0 | 2.0 | 2.0 | 2.0 | 2.0 | 2.0 | 2.0 |

TABLE 1-continued

| Rubber compositions | A | B | C | D | E | F | G | H |
|---|---|---|---|---|---|---|---|---|
| Vulcanization accelerator (Ns) | 2.0 | 2.0 | 2.0 | 2.0 | 2.0 | 2.0 | 2.0 | 2.0 |
| Vulcanization aid (HMT) | 1.0 | 1.0 | 1.0 | 1.0 | 1.0 | 1.0 | 1.0 | 1.0 |
| Phenol resin | 5 | 10 | 12 | 15 | 18 | 23 | 30 | 35 |
| Complex elastic modulus (MPa) | 15 | 30 | 40 | 50 | 55 | 69 | 80 | 90 |

Figure 3:
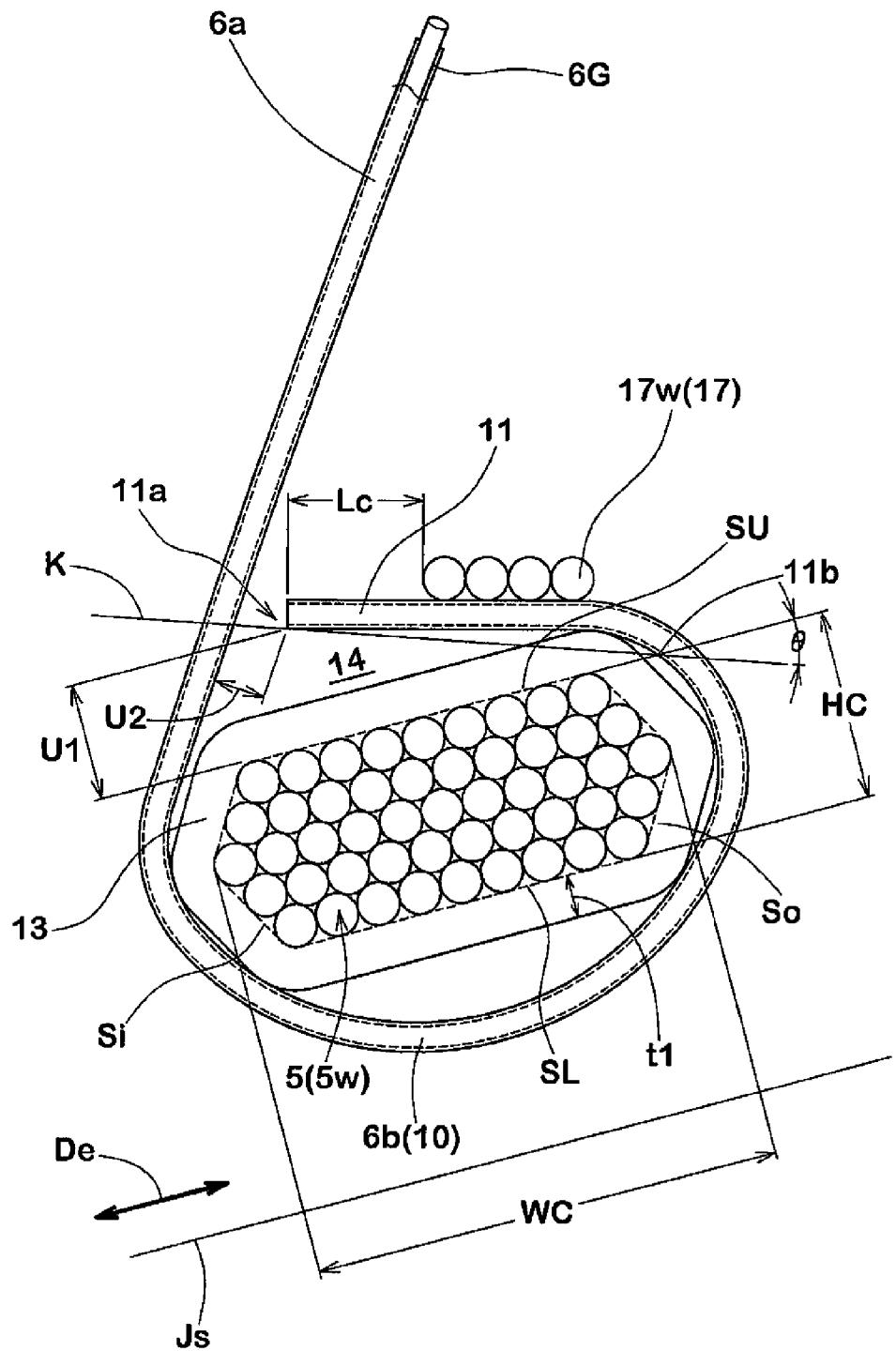
FIG. 3 is a diagrammatic cross sectional view illustrating main parts of the bead portion in a further enlarged form.

According to the present invention, as briefly explained above, each edge portion 6b of the carcass ply 6A is wound almost once around the bead core 5 in each of the bead portions 5. Thus, as shown in FIG. 3, the wound edge portion 6b is composed of a radially inner base part 10 and a radially outer part 11.

The base part 10 is curved along the axially inner face Si, radially inner face SL and axially outer face So of the bead core 5, describing an arc which is almost hemicycle in this example.

The radially outer part 11 is positioned in the vicinity of the radially outer face SU of the bead core 5, and extends axially inwardly, separating from the outer face SU. The radially outer part 11 extends towards the carcass ply main portion 6a, but terminates before the carcass ply main portion 6a. If the distance u2 between the terminal end 11a thereof and the main portion 6a is less than 0.5 mm, the end 11a is very liable to come into contact with the carcass cords in the main portion, causing cord damages such as fretting wear. On the other hand, if the distance U2 exceeds 5.0 mm, as the outer part 11 becomes too short, the securing to the bead cores 5 tends to become insufficient. Therefore, the distance U2 is preferably set in a range of not less than 0.5 mm, but not more than 5.0 mm.

If the steel carcass cords are bent sharply, the cord strength is lowered at the bent position. Therefore, it is better to avoid sharp bent and also preform based on such sharp bent, and it is desirable that the wound portion 6b is curved gently. In view of this, the distance U1 between the terminal end 11a and the radially outer face SU of the bead core 5 is set to be at least 2.0 mm. However, if the terminal end 11a is positioned far from the radially outer face SU, the stress on the terminal end 11a increases. In this view, the distance U1 is set to be at most 8.0 mm.

When the steel carcass cords are curved gently without performing, their spring back becomes strong. Therefore, a stabilizing cord layer 17 is usually disposed on the radially outside of the radially outer part 11 in order to prevent the spring back during making the tire and also in the finished tire.

The stabilizing cord layer 17 is formed by winding a single steel cord 17w, at least once, preferably a plurality of times (2 to 6 times) spirally, around the radially outer part 11.

If an organic fiber cord is used instead, as the vulcanization of the tire is carried out at a very high pressure and high temperature, the organic fiber cord is usually elongated relatively greatly, so it is difficult to stably retain the radially outer part 11 in an intended form.

Preferably, the strength of the steel cord 17w is set in a range of from 2,000 to 4,000 N, and coated with a topping rubber. If the strength is less than 2,000 N, the number of windings of the cord must be increased in order to provide a sufficient strength in total, so the productivity is lowered. On the other hand, if the strength is more than 4,000 N, the cord 17w becomes excessively hard, so the workability in winding the cord 17w is lowered.

A suitable position of the stabilizing cord layer 17 somewhat depends on the number of the windings of the cord 17w, but it is preferable that at least significant portion, preferably the entirety, of the stabilizing cord layer 17 is positioned within a range between 1 mm and 10 mm as the distance LC measured from the terminal end 11a along the radially outer part 11. If the distance LC from the terminal end 11a to the stabilizing cord layer 17 is less than 1 mm, the stress received from the carcass ply main portion through the adjacent rubber when the tire is deflected is increased and the shearing stress between the stabilizing cord layer 17 and radially outer part 11 tends to increase. If the distance LC from the terminal end 11a to the stabilizing cord layer 17 is more than 10 mm, as the freed part is increased, it becomes difficult to fully avert the adverse affect of spring back.

If the radially outer part 11 of the carcass ply wound portion 6b is inclined largely towards the radially outside, then the stabilizing cord layer 17 is liable to slip out toward the axially outside during making the tire, and in the finished tire, the securing force to the bead core decreases. Therefore, the overall inclination angle of the radially outer part 11 is limited to at most 45 degrees, preferably less than 30 degrees with respect to the tire axial direction. Here, the overall inclination angle is the inclination angle of a straight line K drawn between the axially inner end 11a of the radially outer part 11 and the axially outer end 11b thereof which is defined as an intersecting point between the wound portion 6b and an extended line of the radially outer face Su as shown in FIG. 3. However, in order to secure the above-mentioned distance u1 of at least 2.0 mm, the overall inclination angle should be larger than minus 5 degrees, preferably the angle is at least 0 degrees, more preferably at least 5 degrees, with respect to the tire axial direction. Incidentally, the above angle values: 45, 30, −5, 0 and 5 degrees can be read out as 60, 45, 10, 15 and 20 degrees, respectively, if the values are indicated as angles (theta) with respect to the radially outer face SU because it inclines at minus 15 degrees.

Therefore, the stabilizing cord layer 17 can prevent the spring back of carcass cords, and the radially outer part 11 can be stably retained in an intended form.

On the radially outside of the stabilizing cord layer 17 and on the radially outside of the radially outer part 11, there is further disposed a bead filler 16 which tapers-radially outwardly to its radially outer end and extends from the bead portion into a lower sidewall portion, while abutting on the axially outside of the carcass ply main portion 6a.

In this embodiment, the bead filler 16 is composed of a radially inner stiffener 16a and a radially outer buffer 16b. The interface (j) therebetween extends from the axially inner surface to the axially outer surface of the bead filler 16 while inclining radially inwards. The radially inner end of the interface (j) is positioned immediately axially outside the bead core 5, and the radially outer end thereof is positioned at the midpoint of the radial height of the bead filler 16.

The stiffener 16a has a radially inner end surface extending over the full axial width of the bead core 5 so as to cover the radially outside of the radially outer part 11 and to bridge between the carcass ply main portion 6a and the axially outer portion 15i of the undermentioned metal cord layer 15. Therefore, the stiffener 16a can fasten the radially outer part 11 in the bead portion together with the stabilizing cord layer 17.

If the complex elastic modulus E*4 of the stiffener 16a is too low, it is difficult to fasten. Therefore, the complex elastic modulus E*4 is set in a range of not less than 20 MPa, preferably more than 25 MPa, more preferably more than 30 MPa. But, if the modulus E*4 is to high, the rigidity of the stiffener becomes excessively increased, so stress concentration occurs at the adjacent cord ends. Therefore, the modulus E*4 is set in a range of not more than 70 MPa, preferably less than 65 MPa, more preferably less than 60 MPa.

The buffer 16b has a complex elastic modulus E*5 which is less than the complex elastic modulus E*4 to moderately decrease the rigidity from the bead portion to the lower sidewall portion. Preferably, the complex elastic modulus E*5 is set in a range of not less than 3 MPa, more preferably not less than 3.5 MPa, but not more than 7 Mpa, more preferably not more than 5 MPa. If the modulus E*5 of the buffer is less than 3 MPa, the difference from that of the stiffener 16a becomes too large, so damages are apt to occur along the interface (j). On the other hand, if the modulus E*5 exceeds 7 Mpa, the rigidity of the bead filler 16 as a whole becomes too high, and damages are liable to occur in the vicinity of the radially outer end of the buffer 16b.

Further, the space between the carcass ply wound portion 6b and the reinforcing rubber layer 13 is filled with a rubber 14 having a complex elastic modulus E*2. Preferably, the complex elastic modulus E*2 is less than the complex elastic modulus E*1 of the reinforcing rubber layer 13, but more than the complex elastic modulus E*3 of the topping rubber 6G of the carcass ply 6A to make the rigidity change gradual (E*1>E*2>E*3). Specifically, the complex elastic modulus E*2 is preferably set in a range of from 5 to 50 MPa. Therefore, a stress and impulsive force acting on the wound portion 6b during running are absorbed, and the occurrence of carcass cord loosening at the terminal end 11a can be effectively prevented.

As descried above, the edge portions of the carcass ply 6A are firmly secured by the wound portion 6b, bead core 5, stabilizing cord layer 17 and stiffener 16a.

However, if the temperature of the bead portion 4 becomes excessively high owing to transmission of heat from the braking device, severe service conditions such as heavy load and high speed, etc., the rubber materials in the bead portion 4 are more or less softened by the heat, which results in loosing of the wound portion 6b. If such loosing is occurred under extraordinary severe conditions, the durability of the bead portion decreases rapidly. Therefore, in order to disperse the heat generated in the bead portion and isolate from the transmitted heat and also to increase the pulling-out resistance of the carcass ply wound portion 6b, a metal cord layer 15 is provided in each of the bead portions 4.

Figure 2:
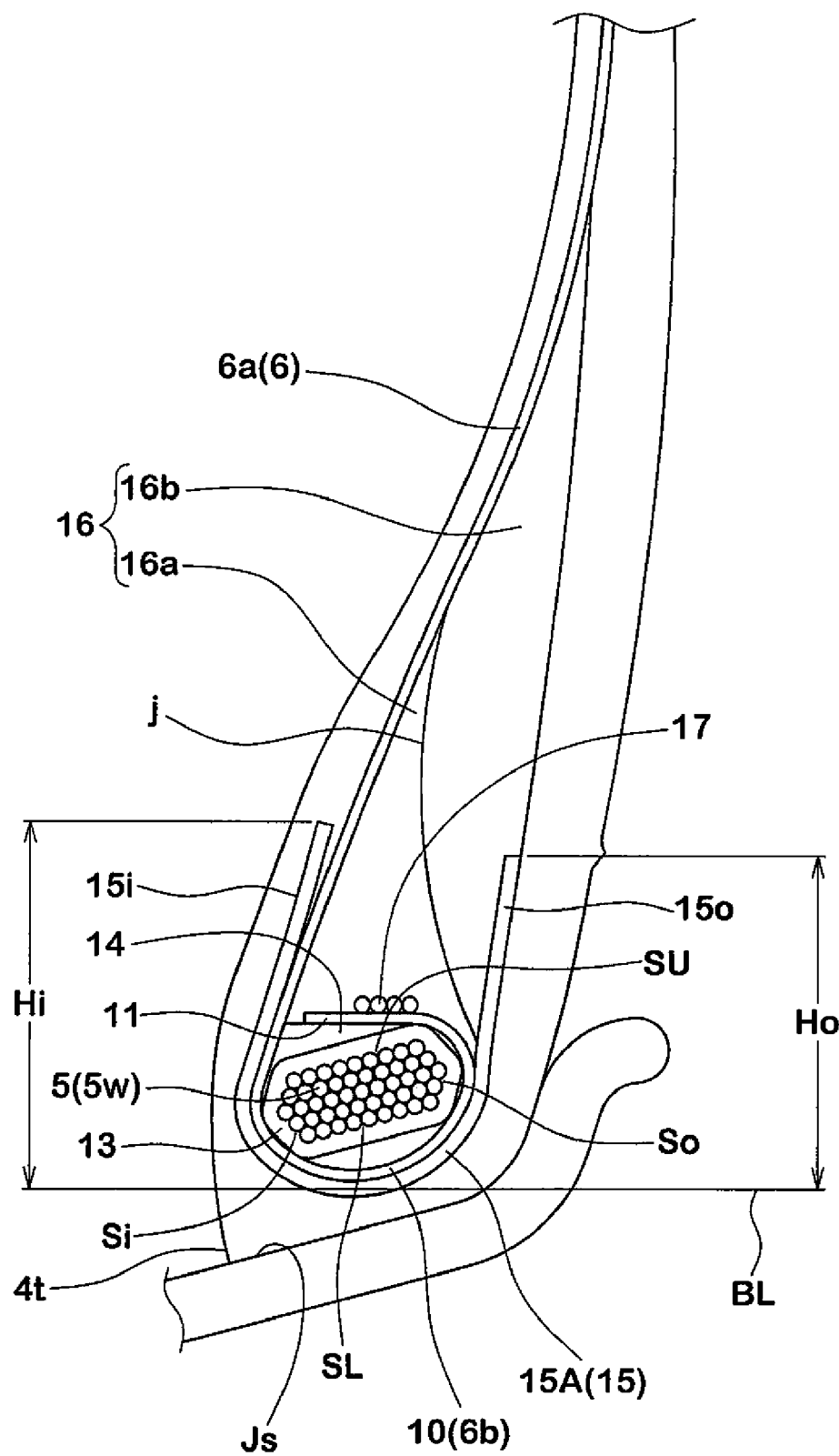
FIG. 2 is an enlarged cross sectional view of the bead portion thereof.

The metal cord layer 15 comprises at least one ply of heat conductive metal cords, in this example a single ply of steel cords, inclined at an angle of 15 to 60 degrees with respect to the tire circumferential direction. The metal cord layer 15 is made up of: a curved base portion 15A extending along the underside of the above-mentioned base part 10; and an axially inner portion 15i and axially outer portion 15o each extending radially outwardly from the base portion 15A, whereby as shown in FIG. 2, the metal cord layer 15 has a U-shaped cross sectional shape.

If the axially outer portion 15o and inner portion 15i are too low in radial height, the above-explained effects can not be expected. Therefore, these portions 15i and 15o extend radially outwardly beyond the radially outermost end (in this example, end 11a) of the wound portion 6b at least. However, if the portions 15o and 15i are too high in radial height and the radially outer ends thereof reach to positions in the sidewall portion 3 where a larger deformation occurs, then the stress is increased at the radially outer ends. Further, in view of tire weight reduction, it is not preferable. Therefore, the radial heights Ho and Hi of the radially outer ends of the axially outer and inner portions 15o and 15i are set in a range of at least 25 mm, but at most 57 mm from the bead base line BL.

In this example, the axially outer portion 15o extends along the axially outside of the bead filler 16, separating from the carcass ply 6A, and radially outwardly beyond the radially outermost end of the rim flange Jf. The axially inner portion 15i extends along the axially inside of the carcass ply main portion 6a, and in this example, in order to mitigate the stress at the radially outer end, the inner portion 15i extends radially outwardly over the outer portion 15o, namely, the height is differentiated as being higher. Further, the radially outer end are slightly separated from the carcass ply by covering the end with a thin rubber sheet in making the raw tire. The difference (Hi-Ho) of the height Hi from the height Ho is at least 2 mm.

The tire 1 according to the present invention is manufactured such that a raw tire is first formed utilizing a tire building drum, and then the raw tire is put in a mold and vulcanized. During vulcanizing the raw tire in the mold, the raw tire is heated and the inside thereof is pressurized to a very high pressure. Therefore, a high contact pressure occurs between the carcass ply and the reinforcing rubber layer 13. Accordingly, the covering thickness t1 of the reinforcing rubber layer 13 over the bead wire is apt to decrease in the finished tire. In order to prevent such a decrease in the covering thickness, it is desirable that, at the time of vulcanizing the raw tire, the reinforcing rubber layer 13 has been vulcanized or semi-vulcanized together with the bead core 5. For instance, to vulcanize or semi-vulcanize the reinforcing rubber layer 13, electron beam exposure may be employed to vulcanize the surface coat rubber in particular. Of course, conventional heating devices utilizing electric heating, steam heating, microwave heating and the like can be used too, to vulcanize the entirety, namely the surface coat rubber and also the rubber penetrated into the windings of the bead wire in particular.

Comparative Tests

Heavy duty radial tires of size 11R22.5 (rim size: 7.50×22.5) for trucks and buses were experimentally manufactured and tested for the remountability and bead durability. The specifications of the test tires are shown in Table 2. specifications not shown are common to all the test tires.

Remountability Test (Air Injecting Test):

The test tires each mounted on a standard rim and inflated to the maximum pressure of 800 kPa were kept for seven days in an environment controlled at a temperature of 80 deg.C. Then, a skilled worker detached each tire from the rim and subsequently remounted the tire on the rim by injecting air into the tire. Based on the remounting operation, the skilled worker evaluated each tire about whether air leakage is little or not.

Further, using an x-ray CT scanner, the bead toe and bead core of the tire remounted on the rim and inflated to 700 kPa were checked for the bead toe lifting and the bead core deformation.

Bead Durability Test:

Using a tire test drum, each test tire mounted on a standard rim was run under accelerated conditions (Tire load: 300% of normal tire load of 27.25 kN, Tire pressure: normal pressure of 700 kPa, Running speed: 20 km/h), to measure the running time up to generation of damages at the bead portion. The results are indicated in Table 2 by an index based on Ref.1 being 100, wherein the larger the value, the better the bead durability.

TABLE 2

Figure 4:
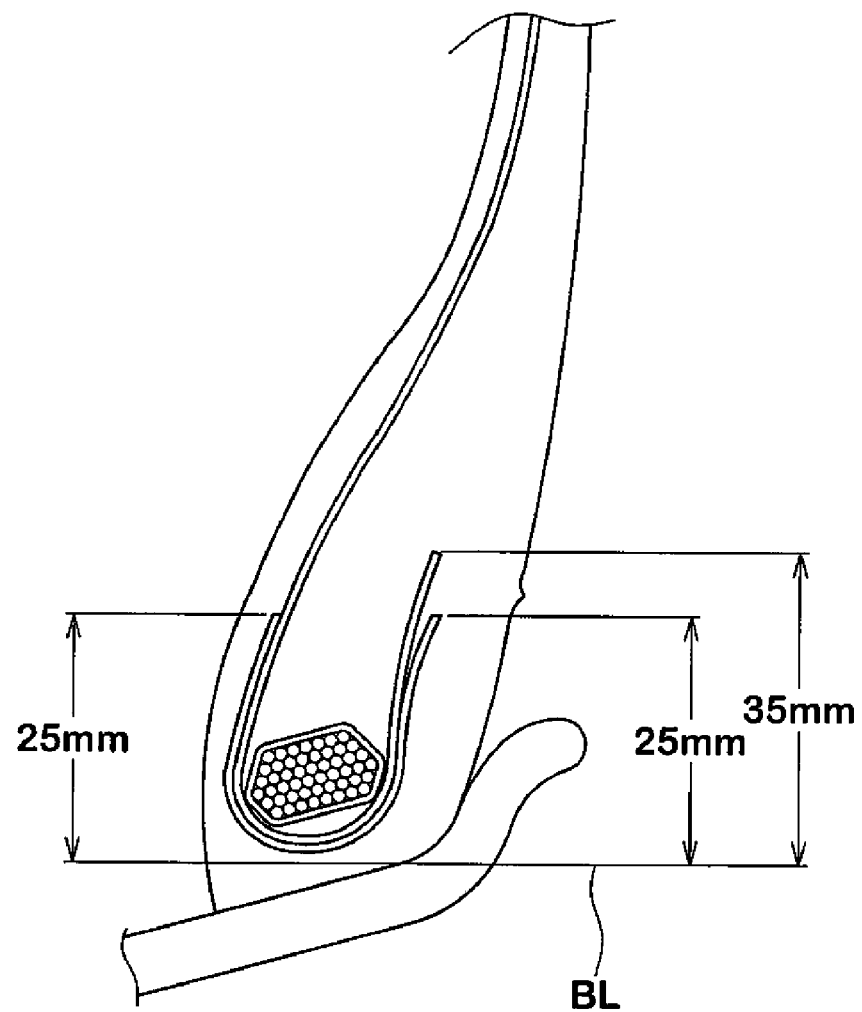
FIG. 4 is a cross sectional view of a conventional bead structure used in a reference tire (Ref.1) in the undermentioned comparative tests.
Figure 5:
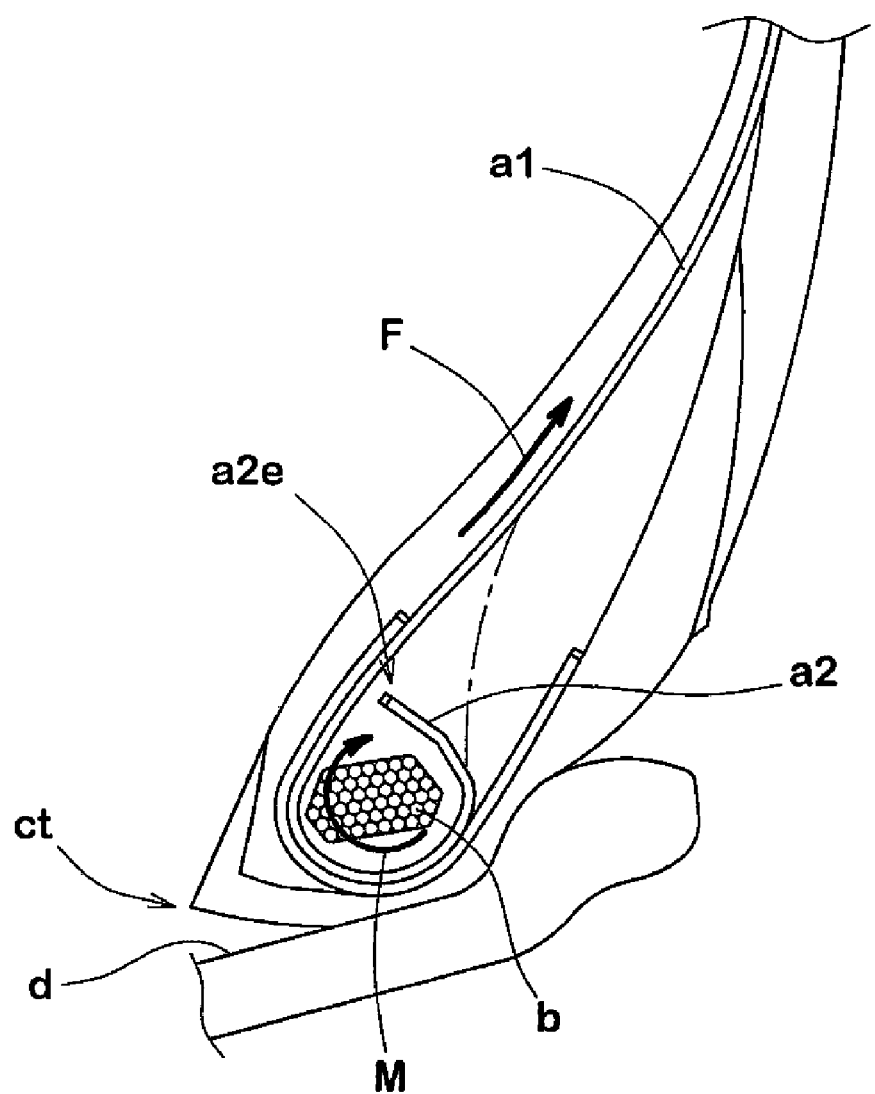
FIG. 5 is a cross sectional view of a bead structure illustrating a prior art.

| Tire | Ref.1 | Ref.2 | Ref.3 | Ref.4 | Ref.5 | Ref.6 | Ex.1 | Ex.2 | Ex.3 | Ex.4 | Ex.5 | Ex.6 | Ex.7 | Ex.8 | Ex.9 |
|---|---|---|---|---|---|---|---|---|---|---|---|---|---|---|---|
| Bead structure | FIG.4 | FIG.2 | FIG.2 | FIG.2 | FIG.2 | FIG.2 | FIG.2 | FIG.2 | FIG.2 | FIG.2 | FIG.2 | FIG.2 | FIG.2 | FIG.2 | FIG.2 |
| Bead core 5 | | | | | | | | | | | | | | | |
| WC/HC ratio | 1.8 | 2.0 | 2.0 | 2.0 | 1.5 | 2.0 | 2.0 | 2.0 | 2.0 | 1.7 | 2.3 | 2.0 | 2.0 | 1.5 | 2.5 |
| Reinforcing rubber layer 13 | | | | | | | | | | | | | | | |
| Modulus E*1 (MPa) | 7 | 50 | 50 | 15 | 50 | 110 | 50 | 30 | 50 | 50 | 50 | 20 | 100 | 50 | 50 |
| Thickness t1 (mm) | 1.0 | 0.3 | 3.5 | 1.0 | 1.0 | 1.0 | 1.0 | 1.0 | 2.5 | 2.5 | 1.0 | 1.0 | 1.0 | 1.0 | 1.0 |
| Carcass ply wound portion 6b | | | | | | | | | | | | | | | |
| Distance U1 (mm) | — | 4.0 | 9.0 | 9.0 | 9.0 | 4.0 | 4.0 | 4.0 | 4.0 | 4.0 | 4.0 | 4.0 | 4.0 | 4.0 | 4.0 |
| Distance U2 (mm) | — | 2.0 | 4.0 | 4.0 | 4.0 | 2.0 | 2.0 | 2.0 | 2.0 | 2.0 | 2.0 | 2.0 | 2.0 | 2.0 | 2.0 |
| Metal cord layer 15 | | | | | | | | | | | | | | | |
| Height Hi (mm) | 25 | 32 | 32 | 32 | 32 | 32 | 32 | 32 | 32 | 32 | 32 | 32 | 32 | 32 | 32 |
| Height Ho (mm) | 25 | 32 | 32 | 32 | 32 | 32 | 32 | 32 | 32 | 32 | 32 | 32 | 32 | 32 | 32 |
| Test Results | | | | | | | | | | | | | | | |
| Remountability | good | bad | good | good | bad | good | good | good | good | good | good | good | good | good | good |
| Bead toe lifting (mm) | 5.0 | 5.5 | 4.0 | 5.0 | 6.0 | 3.0 | 3.0 | 3.5 | 2.5 | 3.5 | 2.3 | 4.5 | 2.0 | 5.0 | 2.3 |
| Core deformation | none | occured | none | occured | occured | none | none | none | none | none | none | none | none | none | none |
| Bead durability | 100 | 110 | 100 | 105 | 105 | 90 | 150 | 145 | 150 | 135 | 140 | 125 | 120 | 125 | 155 |

From the test results it was confirmed that, according to the present invention, the bead core deformation can be completely prevented, while suppressing the bead toe lifting within an acceptable range such that a good remountability is maintained, and the durability of the bead portion can be remarkably improved.

As described above, in the pneumatic tire according to the present invention, the bead core around which the carcass ply is wound is provided with an elongated cross sectional shape having a specific width/height ratio. Therefore, the bead toe lifting is reduced and the remountability can be improved. Further, the bead core is covered with the high modulus rubber having a specific covering thickness to firmly bundle the windings of the bead wire. Therefore, the deformation of the cross sectional shape of the bead core can be suppressed, and the deterioration of the bead durability can be prevented.

The invention claimed is:

1. A pneumatic tire comprising
a tread portion,
a pair of sidewall portions,
a pair of bead portions with a bead core therein, and
a carcass ply extending between the bead portions through the tread portion and sidewall portions, and wound around the bead core in each said bead portion from the axially inside to the axially outside of the tire so as to form a pair of wound portions and a main portion therebetween, wherein
said bead core has a cross sectional shape elongated in a direction substantially parallel to the bottom of the bead portion so that the width (WC) thereof measured in said direction is in a range of 1.5 to 2.5 times the height (HC) thereof measured perpendicularly to said direction, and
the bead core is covered with a reinforcing rubber layer made of a high modulus rubber having a complex elastic modulus E*1 of from 30 to 100 Mpa and a substantially constant thickness t1 of from 0.5 to 3.0 mm, and
the resultant space in each said bead portion formed between the wound portion of the carcass ply and the reinforcing rubber layer is filled with a filler rubber having a complex elastic modulus E*2 less than the complex elastic modulus E*1 of the reinforcing rubber layer.

2. The pneumatic tire of claim 1, wherein
each said wound portion is terminated near a radially outer face of the bead core so that the terminal end is positioned at a distance (U1) of 2.0 to 8.0 mm from the radially outer face of the bead core and at a distance (U2) of 0.5 to 5.0 mm from the main portion of the carcass ply.

3. The pneumatic tire of claim 1, wherein
each said bead portion is provided on the radially outside of a radially outer part of the wound portion with a stabilizing cord layer formed by winding a steel cord at least one turn.

4. The pneumatic tire of claim 1, wherein
each said bead portion is provided with a metal cord layer composed of: a base portion extending along the radially inside of the carcass ply wound portion; an axially outer portion extending radially outwardly separating from the carcass ply wound portion; and an axially inner portion extending radially outwardly along the axially inside of the carcass ply main portion.

5. The pneumatic tire of claim 1, wherein the carcass ply is a ply of steel cords rubberized with a topping rubber and the complex elastic modulus E*2 of the filler rubber is more than the complex elastic modulus E*3 of the topping rubber of the carcass ply.

* * * * *

UNITED STATES PATENT AND TRADEMARK OFFICE
CERTIFICATE OF CORRECTION

| | |
|---|---|
| PATENT NO. | : 7,604,032 B2 |
| APPLICATION NO. | : 11/446108 |
| DATED | : October 20, 2009 |
| INVENTOR(S) | : Kiyoto Maruoka |

It is certified that error appears in the above-identified patent and that said Letters Patent is hereby corrected as shown below:

ON THE TITLE PAGE:

At Item (75), Inventor, Change

"Kiyohito Maruoka, Kobe (JP)"

to

--Kiyoto Maruoka, Kobe (JP)--.

Signed and Sealed this

Twenty-first Day of September, 2010

David J. Kappos
*Director of the United States Patent and Trademark Office*